United States Patent [19]
Lawrence et al.

[11] Patent Number: 5,760,593
[45] Date of Patent: Jun. 2, 1998

[54] GAP MEASUREMENT DEVICE

[75] Inventors: David Charles Lawrence, Brownsburg, Ind.; Anthony Geoffrey Sheard, Ripley, England

[73] Assignee: BICC Public Limited Company, London, England

[21] Appl. No.: 615,372

[22] Filed: Feb. 14, 1996

[51] Int. Cl.[6] .............................. G01B 7/14; G01R 27/26; G01N 27/72

[52] U.S. Cl. .................... 324/662; 324/661; 33/544.4; 33/613; 33/656; 73/117.3; 73/660; 73/661; 250/559.31; 348/135; 376/245; 376/258

[58] Field of Search ................................ 342/661, 662, 342/220, 207.15, 207.16; 33/544.4, 613, 656; 73/117.3, 660, 661; 250/559.31; 348/135; 376/245, 258

[56] References Cited

FOREIGN PATENT DOCUMENTS 2 131 176  6/1984  United Kingdom .

OTHER PUBLICATIONS

"A Transient Flow Facility for the Study of the Thermofluid-Dynamics of a Full Stage Turbine Under Engine Representative Conditions", Ainsworth et al, ASME Paper 88-GT-144, 1988.

"Developments in Instrumentation and Processing for Transient Heat Transfer Measurements in a Full Stage Model Turbine", Ainsworth et al, ASME, Journal of Turbomachinery, vol. 111, pp. 20–27, Jan. 1989.

"The Aerodynamic and Mechanical Performance of a High Pressure Turbine Stage in a Transient Wind Tunnel", A.G. Sheard et al, ASME, Journal of Turbomachinery, vol. 114, pp. 132–140, Jan. 1992.

"Blade by Blade Tip Clearance Measurement in Aero and Industrial Turbomachinery," B. Killeen et al, Procs. of the 37th ISA Int. Instrumentation Symposium, pp. 429–447, 1991.

(List continued on next page.)

*Primary Examiner*—Patrick Ryan
*Assistant Examiner*—Cathy F. Lam
*Attorney, Agent, or Firm*—Gary M. Nath, Esq.; Nath & Associates

[57] ABSTRACT

This invention provides a device for capacitively measuring the distance to an object, which comprises an electrode that will couple capacitively with the object, a shield that surrounds the electrode and is electrically isolated from the electrode by means of insulation, and a layer of insulation that surrounds the shield, wherein the insulation between the electrode and the shield, and the insulation that surrounds the shield, are formed by deposition.

This invention further provides a method for measuring the distance to a solid object, which comprises forming an electrode that will capacitively couple with the object, depositing a layer of insulation over at least part of the electrode so that the insulation surrounds the electrode, depositing a layer of metal over the insulation to form a shield, and depositing a second layer of insulation over the shield.

15 Claims, 1 Drawing Sheet

OTHER PUBLICATIONS

"An On–Line Calibration Technique for Improved Blade by Blade Tip Clearance Measurement," A.G. Sheard et al, Procs. of the 38th ISA Int. Instrumentation Symposium, pp. 32–51, 1992.

"Electromechanical Measurement of Turbomachinery Blade Tip–to–Casing Running Clearance," A.G. Sheard et al, ASME Paper 92–GT–50, 1992.

"The Dynamic Characteristics of a High Pressure Tube in Stage in a Transient Wind Tunnel", A.G. Sheard et al, ASME Paper 92–GT–166, 1992.

"A Hybrid System for High Temperature Tip Clearance Measurement", A.G. Sheard et al, Procs. of the 39th ISA Int. Instrumentation Symposium, pp. 379–394, 1993.

"A High Speed Capacitance Based System for Gauging Turbomachinery Blading Radius During the Tip Grind Process", A.G. Sheard et al, ASME, Journal of Engineering for Gas Turbines & Power, vol. 116, pp. 243–249, 1994.

"A Blade by Blade Tip Clearance Measurement System for Gas Turbine Applications", A.G. Sheard, ASME, Journal of Engineering for Gas Turbines & Power, vol. 117, No. 2, pp. 326–331, 1995.

"Capacitive Measurement of Compressor and Turbine Blade Tip to Casing Running Clearance", D. Muller et al, accepted for publication at the 41st ASME International Gas Turbine & Aeroengine Congress, held Jun. 10–13 1996, Birmingham, England.

GAP MEASUREMENT DEVICE

This invention relates to the measurement of gaps, and especially to the measurement of gaps in gas turbines, for example the measurement of gaps from a prove to a solid object such as a shaft, disc, or to an intermittent object such as a turbine blade of the like.

BACKGROUND OF THE INVENTION

In many fields, and especially in the case of gas turbines, there is a need for a gap measurement probe that is able to function at very high temperatures, for example in the order of 100° C. or more, and indeed, in order to improve the thermodynamic efficiency of such engines, work is being conducted to increase the working temperature, for example to 1200° C. or higher, for example to 1500° C. or above. In such environments it is not possible to employ probes that rely on permanent magnetism of materials, and also it is important to ensure that all materials used to manufacture the probe can withstand the temperatures that will be experienced. For this reason, capacitance probes have been proposed for use in turbines.

One use of such probes in the case of turbines, is to measure the clearance between the tips of the turbine blades and the housing. It is highly desirable to minimize this clearance in order to maximize the efficiency of the turbine, and a gap of 1 mm would be typical of current turbines although it is desired to reduce this further. In order to achieve such small clearances, it is necessary to provide probes that are located in the housing and detect the presence of the turbine blades as they pass the probe. Such a probe typically will comprise an electrode that will couple capacitively with the turbine blade, a shield that is located between the electrode and the turbine casing, a probe body that surrounds the shield and enables the probe to fit precisely in the recess that is provided for it in the casing, and insulation provided between the electrode and shield and also between the shield and retainer in order to electrically isolate the electrode and shield from the casing. The electrode is connected to the centre conductor of a triaxial cable, and the shield to the intermediate screen of the cable while the retainer or the housing is connected to the outer screen of the cable which removes the signals from the probe from the vicinity of the turbine. The signal from the electrode is passed to the shield via a unity gain amplifier so that the electrode signal is screened from ground (the casing) by means of a buffered version of itself.

Such a probe will function quite satisfactorily to enable a blade—casing gap to be maintained at about 1 mm, but it is extremely expensive to manufacture: The probe will be expected to operate at a temperature in the order of 1000° C. which means that the insulating elements must be manufactured from machined ceramics. Furthermore, the insulating elements, which are in the form of rings, will have as small a wall thickness as possible in order to be able to maximize the size of the electrode (which increases the sensitivity of the probe), thereby increasing the difficulty and cost of manufacture. In addition, the assembly of the probes is a highly skilled operation which adds to the cost of the final product, especially since the probes must be installed in a turbine and tested at the normal operating temperature in of the turbine.

SUMMARY OF THE INVENTION

According to the present invention, there is provided a device for capacitively measuring the distance to an object, which comprises an electrode that will couple capacitively with the object, a shield located about the electrode and electrically isolated from the electrode by means of insulation, and a layer of insulation that surrounds the shield, wherein the insulation between the electrode and the shield and the insulation that surrounds the shield are formed by deposition.

The device according to the invention has the advantage of significantly reduced manufacturing cost due to the removal of two physical components (the ceramic insulating rings) that are difficult to machine, and their replacement by deposited layers which are simple and inexpensive to form. In addition, because the insulation between the electrode and the shield, and the insulation surrounding the shield, will be much thinner than the radial thickness of any preformed ceramic disc can be, the diameter of the electrode can be significantly increased for any given aperture size in an engine casing, thereby increasing the sensitivity of the device. In the case of preferred devices according to the invention, it is possible for substantially the entire diameter of the device to be taken up by the electrode.

The probe may, if desired, include a shield as a performed part, in which case the insulation between the electrode and shield and the insulation between the shield and the casing may both be deposited on the shield. Such a probe thus is formed solely by machining parts from metal (the electrode, the part(s) forming the shield and the body (if any)) rather than from ceramics.

Alternatively, the insulation between the electrode and the shield may be deposited on the electrode instead of the shield. In this form of probe, the shield itself may then be deposited on the insulation, and, if desired, the insulation between the shield and the housing may be formed on the shield by deposition. However the shield is formed, it is preferred for it to enclose the electrode substantially entirely with the exception of that part of the electrode that will couple capacitively with the object, in order to reduce or eliminate any capacitive coupling with any other elements such as an engine casing or the like. A probe body that is formed as a separate part may be provided if desired, or alternatively, it may also be formed on the insulation by deposition. This form of probe has the advantage that it can be formed as a single, monolithic, item, thereby not only removing the expensive machining operations for forming the ceramic insulation rings, but also removing the skilled assembly process of the probe.

An additional advantage of this form of probe is that is will not be the subject of differential thermal expansion of its component parts in operation. If a conventional prove were to be used for turbine blade tip clearance measurement, differential thermal expansion of the metal and ceramic parts could cause them to become loose to some degree when the probe is heated up to the normal operating temperature of about 1000° C. Also, the difference in pressure on either side of the turbine blades as they pass the probe applies a vibrating force on the electrode at a frequency up to 6000 Hz or higher, normally from 1000 to 6000 Hz, which causes the probe electrode to apply a vibrating shearing force on the ceramic insulating rings. In some instances, for example with certain turbochargers, the vibrating force can have a frequency as high as 100 kHz. This shearing force could, after a prolonged operation time cause damage to the ceramic rings which would lead to catastrophic failure of the system if the probe became detached from the casing. In contrast, with the probe according to the invention, substantially the entire probe can formed from the same material, thereby avoiding the problems of differential thermal expansion. Furthermore, by removing the ceramic rings, which are relatively poor thermal conductors, temperature differences over different regions of the probe can be reduced.

Although for many purposes the electrode may be formed from a solid body of metal, this has the disadvantage that its operating temperature is limited to the maximum operating temperature of the metal, for example, about 1125° C. in the case of steel. According to a preferred aspect of the invention, the electrode is formed as a ceramic body, and the shield, together with the layers of insulation between the electrode and the shield and between the shield and the housing are formed by deposition. The electrode may be rendered conductive by having a layer of conductive material, for example metal, deposited on the ceramic, or alternatively, the ceramic body could be formed as a conductive ceramic/metal composite. In this way, it is possible to form a probe which contains no bulk metal parts, and so can operate at significantly higher temperatures, for example up to 1200° C. or higher, for example up to 1500° C. or beyond. Thus, it may be possible by this method to form a stoichiometric probe, that is to say, a probe that can be used in turbines in which fuel is burned in a stoichiometric quantity of oxygen in order to maximize the thermodynamic efficiency of the engine.

The layers that are formed by deposition may be formed by any method that will generate a layer that has the necessary adhesion and thermal stability to enable it to operate at the relevant temperature, for example or 1000° C., 1200° C. or 1500° C. The layers may, for example, be formed by deposition in the condensed phase, for instance by sol-gel methods, which involve the hydrolysis and polycondensation of a metal alkoxide, for example silicon tetraethoxide, titanium butoxide or aluminium butoxide to produce in inorganic oxide gel which is converted to an inorganic oxide glass by a low temperature heat treatment. Alternatively, the layers may be formed by other deposition techniques, for example by vacuum deposition methods such as plasma assisted chemical vapour deposition, by sputtering or, preferably, by plasma deposition, all of which processes are well known and commercially employed for a number of purposes. In the case of plasma deposition, the component is spun in a vacuum while a ceramic or metal powder is sprayed through an arc or flame that flashes it into a plasma. As the plasma hits the cold spinning part, it condenses, forming a layer of ceramic or metal. Each layer of insulation or metal may be formed as a single layer only, or if desired may be built up from a number of layers. For example, one or more keying layers may be provided in order to improve the adhesion between the top layer and the substrate, the keying layer(s) being formed, for example by a different vacuum deposition process and/or having a different stoichiometry from that of the top layer so that the properties of the layers are graded over the total thickness. The insulating layers that are deposited by these methods are generally oxides and nitrides of metals or metalloids, for example oxides and nitrides of aluminium, titanium, tantalum and silicon, or mixtures thereof with themselves or with other oxides or nitrides. Thus, the use of mixed metal oxides for the layers is also envisaged. It should be appreciated, however, that the invention, at least in its broadest aspect, is not limited to any particular deposition technique.

Thus, according to another aspect of the invention, there is provided a method of forming a device for capacitively measuring the distance of a turbine blade tip from the internal surface of a casing; which comprises forming an electrode that will couple capacitively with the turbine blade, depositing a layer of insulation over at least that part of the electrode that will be located in the casing, depositing a layer of metal over the insulation to form a shield, and depositing a second layer of insulation over the shield. This method of manufacture of the device may be employed for forming any of the devices described above.

The layers may be formed to any thickness that is appropriate to the function of the layer. For example, in the case of the shield and the electrode, a thickness of from 0.01 to 1 micrometers, preferably from 0.1 to 0.2 micrometers will be appropriate in order to provide the necessary electrical conductivity, while for the layers of electrical insulation, thicknesses of from 0.2 to 0.5 micrometers will be appropriate. However, according to a preferred aspect of the invention, that part of the electrode that faces the object (the "front face"), especially where the probe is intended to be used to measure turbine blade tip clearance, may be formed with a significantly greater thickness, for example with a thickness greater than 0.5 mm, preferably in the range of from 0.5 to 2 mm, and especially from 0.75 to 1.5 mm. Such a layer can be formed so that the layer is softer than the material forming the turbine blade, and so be abradable by the turbine blade, thereby ensuring a very small and controllable gap between the blade and the front face of the electrode. Although the probe could be manufactured in its entirety before installation in the casing, it is possible to form the probe without the front face of the electrode, to install the probe in the casing and only then to deposit the front face of the electrode. The front face of the electrode can then be machined back to the required level, leaving the probe flush with the inside of the casing. During operation of the engine, a blade tip could erode the casing liner and the front face of the probe, but still leave the probe operational. This would result in the probe giving an output of true tip clearance after a rub as the probe tip would still be flush with the casing inner diameter. In contrast, conventional probes are not abradable, and are recessed in the casing. After the first rub, the distance from the probe front face to the casing inner diameter changes, and all clearance readings are incorrect from that point on.

Although described principally with reference to turbines (since such engines generally provide the most demanding environment), the device according to the invention can be used for gap measurement in general and can function at temperatures up to the limit of the materials from which it is formed. It can be employed anywhere in a gas turbine, steam turbine or other turbomachinery, reciprocating engine or other equipment requiring measurement of gap size.

BRIEF DESCRIPTION OF THE DRAWINGS

Several forms of probe according to the present invention will now be described by way of example with reference to the accompanying drawings, in which.

DETAILED DESCRIPTION OF THE INVENTION

Figure 1:
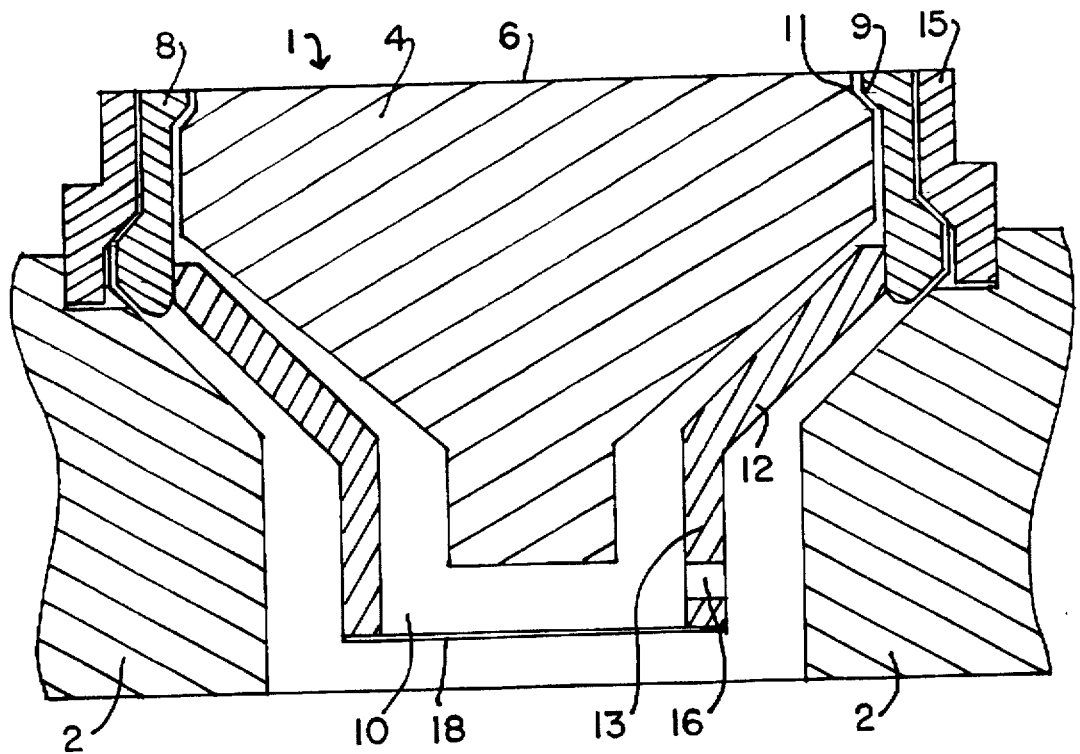
FIG. 1 is a section through a first form of gap probe according to the invention.

Referring to the accompanying drawings, FIG. 1 shows gap measurement probe 1 for determining the position of the tip of a turbine blade (not shown) with respect to the turbine casing 2. The probe 1 comprises an electrode 4 formed from steel having a front face 6 that is directed toward the turbine and across which the tips of the turbine blades pass as the turbine rotates. The electrode 4 is located within a shield with comprises a bottom guard 8 and a top guard 10, each of which is also machined from steel. The bottom guard 8 has an internal lip 9 that engages a peripheral recess 11 in the electrode in order to ensure that the electrode cannot slide forward out of the bottom guard 8 toward the turbine blades, and the top guard 10 has a generally frusto-conical belled portion 12 and cylindrical portion 13, the belled position 12 being capable of engaging the rear shoulder of the electrode 4 to prevent the electrode sliding backwards into the engine casing 2. Around the outside of the bottom guard 8 is located a retainer 15 which seats the bottom guard 8, top guard 10 and electrode 4 correctly within a recess in the engine casing 2.

The bottom guard 8 has been provided over its entire surface except for those parts thereof in contact with the top guard 10 with a 0.2 mm thick layer of insulation formed from aluminum nitride by plasma deposition so that, when assembled, the metal forming the top guard will be electrically insulated from both the electrode 4 and the turbine casing 2. The top guard 10 is be similarly coated although it may be entirely separated from both the electrode 4 and the casing 2 by means of an air gap. The electrode 4 is connected to the center conductor of a triaxial cable (not shown) by conventional means, while the screen formed by the top and bottom guards 8 and 10 are connected to the intermediate screen of the triaxial cable. The screen voltage is set to that of the electrode by means of a unity grain amplifier, so that it will prevent any capacitive coupling between the electrode and the turbine casing 2 which is at ground potential.

The probe 1 is formed in a very simple and inexpensive manner, without the need to form any parts from ceramics by machining, and will be able to withstand any temperature up to the maximum working temperature of the steel parts thereof.

In order to assemble the probe 1, the top guard 8 and the bottom guard 10 are slipped over opposite ends of the electrode 4 and butted together or otherwise engaged so that they enclose the electrode, and so that the electrode is firmly held between the two guards by means of the lip 9 in the bottom guard and the belled portion 12 of the top guard. Although clearances are shown between the various parts of the assembly, this is simply for the sake of clarity. The top guard 8 and bottom guard 10 are then welded together and a hole 16 is drilled through the cylindrical part 13 of the top guard 10 generally at a level of the end of the electrode to enable the triaxial cable to be inserted. The cable (not shown) is cut back and inserted through the hole and the central wire of the cable is brazed to the end face of the electrode and the intermediate screen is brazed to the top guard 10. The probe 1 is then dropped into the recess provided in the engine casing 2 and the retainer 15 is located around the electrode and top guard 8 and welded to the casing 2, thereby preventing the probe 1 from sliding out of the casing recess toward the turbine blades. The outer screen of the triaxial cable is welded to the engine casing 2, and a thin piece of shim stock 18 is spot welded over the end of the top guard 10 so that the entire electrode is surrounded by the shield formed by the top and bottom guards with the exception of the front face 6 thereof. A ceramic packing disc (not shown) is then placed over the end of the cylindrical portion of the top guard 10 and a metal disc (not shown) is positioned over the packing disc to close the recess in the casing 2, and is tack welded to the casing.

Figure 2:
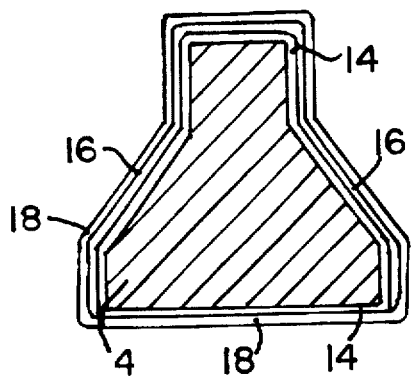
FIG. 2 shows schematically a second form a gap probe according to the invention.

FIG. 2 shows schematically a similar form of capacitance probe to that shown in FIG. 1, but in which the electrode 4 has been provided with a first ceramic insulating layer 14 over its entire surface (including the front face), followed by a 0.3 mm thick layer 16 of platinum/iridium (excluding the front face) which forms the shield, and finally a further 0.2 mm thick layer 18 of ceramic which insulates the shield from the turbine casing 2. The probe corresponds to the assembly of the electrode 4, bottom guard 8 and top guard 10 shown in FIG. 1, and can be secured in a recess in the engine casing and operated exactly as the probe shown in FIG. 1. The probe has the advantage that only one element, the electrode 4, need be formed by machining, thereby reducing manufacturing costs.

Figure 3:
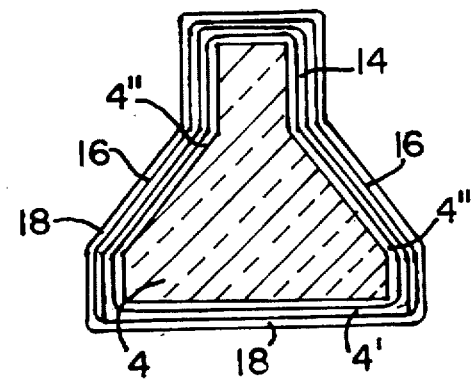
FIG. 3 shows schematically a third form of gap probe according to the invention.

FIG. 3 shows a modification of the probe shown in FIG. 2 in which the electrode 4 has an electrode body 4' formed from bulk ceramic, on which a platinum/iridium layer 4" has been deposited by plasma deposition. The insulation layers 14 and 18 and the shield 16 are formed on the electrode 4 as described above with reference to FIG. 2. This form of probe has the advantage that it contains no bulk metal parts. The only bulk parts are formed from a ceramic, and so it is possible for this probe to withstand significantly higher temperatures, for example in excess of 1200° C. without failing.

Figure 4:
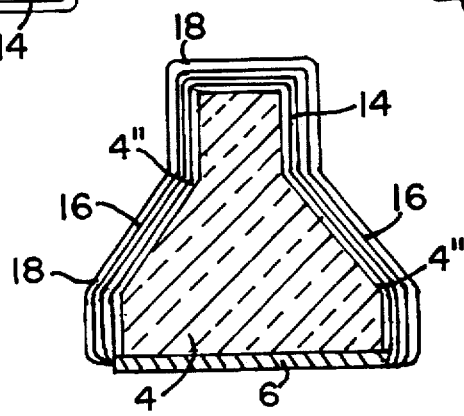
FIG. 4 shows schematically a modification of the probe shown in FIG. 3.

FIG. 4 shows schematically an improvement of the probe shown in FIG. 3 in which the front face 6 of the electrode 4 is formed as a relatively thick coating of metal which has been deposited in the form of a relatively low density, porous metal layer or a metal/ceramic composite. The layer forming the front face has a thickness of about 1 mm and is relatively soft (compared with the ceramic or the turbine blade), so that, after installation, the front surface of the electrode may be abraded by the turbine blades, thereby forming a small and controllable gap between the two.

We claim:

1. A device for capacitively measuring the distance between a turbine blade in a turbine and another part of the turbine which comprises an electrode that will couple capacitively with the turbine blade, said electrode having a part which faces the turbine blade, a deposited electrically conductive layer on said part which faces the turbine blade, a shield that surrounds the electrode except where the electrically conductive layer is located, a deposited ceramic coating of insulation between said electrode and said shield such that said shield is electrically isolated from the electrode by means of said insulation, and a deposited ceramic layer of insulation that surrounds the shield.

2. A device as claimed in claim 1, which contains the shield as a preformed part, and the insulation between the electrode and the shield, and the insulation that surrounds the shield, have both been formed on the shield by deposition.

3. A device as claimed in claim 1, wherein the insulation located between the electrode and the shield has been deposited on the electrode.

4. A device as claimed in claim 3, wherein the shield has been formed on the insulation deposited on the electrode by deposition.

5. A device as claimed in claim 4, wherein the insulation that surrounds the shield has been formed on the shield by deposition.

6. A device as claimed in claim 5, wherein the electrode is formed as a solid body of metal.

7. A device as claimed in claim 5, wherein the electrode comprises a solid body of a ceramic on which an electrically conductive layer has been deposited.

8. A device as claimed in claim 7, wherein the deposited electrically conductive layer on that part of the electrode that faces the turbine blades has a thickness of at least 0.5 mm.

9. A device as claimed in claim 8, wherein the deposited layer of insulation comprises an oxide or nitride of a metal or metalloid.

10. A device as claimed in claim 9, wherein any deposited layer has been deposited by a vacuum deposition method.

11. A device as claimed in claim 10, wherein any deposited layer has been formed by a chemical vapour deposition method, a sputtering method or a plasma deposition method.

12. A device as claimed in claim 1, wherein the deposited electrically conductive layer of that part of the electrode that faces the turbine blades is of a relatively low density, porous metal that is relatively soft so that said conductive layer can be abraded by the turbine blades, thereby forming a small and controllable gap therebetween.

13. A device as claimed in claim 12, wherein the deposited electrically conductive layer on that part of the electrode that faces the turbine blades is about 1 mm.

14. A device as claimed in claim 1, wherein the deposited electrically conductive layer on that part of the electrode that faces the turbine blades is of a metal/ceramic composite that is relatively soft so that said conductive layer can be abraded by the turbine blades, thereby forming a small and controllable gap therebetween.

15. A device as claimed in claim 1, wherein the deposited electrically conductive layer on that part of the electrode that faces the turbine blades is about 1 mm.

* * * * *